(12) United States Patent
Suekuni et al.

(10) Patent No.: US 6,335,310 B1
(45) Date of Patent: Jan. 1, 2002

(54) CONDUCTIVE LUBRICANT FOR FLUID DYNAMIC BEARING

(75) Inventors: Noriko Suekuni, Chiba-ken; Koji Yoshizaki, Osaka-fu; Hiroshi Komiya, Nara-ken, all of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/690,480

(22) Filed: Oct. 18, 2000

(30) Foreign Application Priority Data

Oct. 21, 1999 (JP) .......................................... 11-299542

(51) Int. Cl.$^7$ ..................... C10M 105/36; C10M 135/10
(52) U.S. Cl. ...................... 508/409; 508/410; 508/496; 508/545; 508/584
(58) Field of Search ................ 508/496, 410, 508/409

(56) References Cited

U.S. PATENT DOCUMENTS

| 4,604,229 A | | 8/1986 | Raj et al. ..................... 252/510 |
| 5,156,759 A | * | 10/1992 | Culpon, Jr. ................. 252/56 R |
| 5,358,650 A | * | 10/1994 | Srinivasan et al. ............ 252/45 |
| 5,744,431 A | | 4/1998 | Diaz et al. ................... 508/410 |
| 5,773,394 A | | 6/1998 | Wan et al. ................... 508/591 |
| 5,858,931 A | * | 1/1999 | Tanaka et al. ............... 508/364 |
| 5,886,854 A | | 3/1999 | Diaz et al. ................ 360/99.08 |

FOREIGN PATENT DOCUMENTS

| EP | 0 206 516 | 12/1986 |
| JP | 57-3897 | 1/1982 |
| JP | 1-77125 | 5/1989 |
| WO | WO 97/16827 | 5/1997 |
| WO | WO 97/18562 | 5/1997 |

* cited by examiner

*Primary Examiner*—Ellen M. McAvoy
(74) *Attorney, Agent, or Firm*—Nixon & Vanderhye P.C.

(57) ABSTRACT

There is provided is a conductive lubricant for a fluid dynamic bearing being able to ground static electricity occurring at the fluid dynamic bearing without impairing the performance of the fluid dynamic bearing. This conductive lubricant for a fluid dynamic bearing is provided by an ester base oil such as dioctyl sebacate that concurrently has heat resistance, a small quantity of evaporation, low cost and wettability to metal, which are necessary for a fluid dynamic bearing. The conductive lubricant contains 0.1 to 5 percent by weight of antistatic additive such as alkyl aryl sulfonate having an affinity for this ester base oil. Therefore, this antistatic additive imparts conductivity to the base oil, by which the static electricity occurring at the fluid dynamic bearing can be grounded without impairing the lubrication performance.

10 Claims, 1 Drawing Sheet

CONDUCTIVE LUBRICANT FOR FLUID DYNAMIC BEARING

BACKGROUND OF THE INVENTION

The present invention relates to a conductive lubricant for a fluid dynamic bearing to be assembled into, for example, an HDD (hard disk drive).

Fluid dynamic bearings are increasingly employed in HDD's in order to provide an increased capacity.

There has conventionally been a fluid dynamic bearing, in which a lubricating oil of an ester-based oil such as diester and polyolester or a polyalkylene glycol oil is interposed between a body of rotation and a bearing member for supporting this body of rotation. This ester-based oil can generate a stable dynamic pressure even when the temperature changes, because it has excellent fluidity at low temperature and a small change in viscosity with respect to temperature change as well as excellent heat resistance.

As an ester-based oil, the conventionally known diester, polyolester or the like is employed. Examples of diester include adipic acid di(2-ethylhexyl) ester (DOA), diisodicyl adipate (DIDA), diisononyl adipate (DINA), di(2-ethylhexyl) azelate (DOZ) and di(2-ethyhexyl) sebacate (DOS). Examples of polyolester include hindered alcohol esters of neopentylglycol (NPG), trimethylolpropane (TMP) and pentaerythritol (PE). These base oils are employed singly or in mixture taking the torque characteristic and operating life of lubrication into consideration.

However, these oils exhibit a very high volume resistivity as apparent from the volume resistivity of each oil indicated in Table 1 below.

TABLE 1

| Oil Type | Volume Resistivity ($\Omega$ cm) (20° C.) |
| --- | --- |
| Mineral Oil | $10^{14}$ or greater |
| Diester Oil | $10^{11}$–$10^{12}$ |
| Polyolester Oil | $7 \times 10^{12}$ |
| Polyalkylene Glycol Oil | $1.2 \times 10^{9}$ |

If an MR head (magneto-resistive head), which is the other contributor to the increase in capacity, is combined with the fluid dynamic bearing, then the head side (stationary side) and the disk side (rotary side) are completely put in a contactless state in operation. Therefore, in this case, it is required to ground the static electricity occurring at the fluid dynamic bearing, for the protection of the MR head that is vulnerable to static electricity.

SUMMARY OF THE INVENTION

Accordingly, the object of the present invention is to provide a conductive lubricant for a fluid dynamic bearing, the conductive lubricant being able to ground the static electricity occurring at the fluid dynamic bearing.

In order to achieve the aforementioned object, the present invention provides a conductive lubricant for a fluid dynamic bearing comprising:

an ester base oil and an antistatic additive having an affinity for the ester base oil, and the antistatic additive being contained at 0.1 to 5 percent by weight in the conductive lubricant.

According to the present invention, an ester base oil that concurrently has heat resistance, a small quantity of evaporation, low cost and wettability to metal, which are necessary for a fluid dynamic bearing is employed, and an antistatic additive having an affinity for this ester base oil is contained at 0.1 to 5 percent by weight in the conductive lubricant. Therefore, according to the present invention, the conductive lubricant having conductivity by virtue of the antistatic additive contained in the conductive lubricant makes the rotary side and the fixed side of the fluid dynamic bearing electrically conductive. Therefore, the static electricity occurring on the rotary side of the fluid dynamic bearing can be earthed on the fixed side. The antistatic additive has an affinity for the ester base oil, and therefore, the lubrication performance is not impaired.

It is to be noted that the conductivity of oil becomes insufficient if the antistatic additive content is smaller than 0.1 percent by weight and becomes incapable of sufficiently discharging the static electricity. If the antistatic additive content exceeds 5 percent by weight, then the lubrication performance of oil is impaired.

In one embodiment, the antistatic additive is contained at 0.5 to 2 percent by weight in the conductive lubricant.

In the above embodiment, the antistatic additive is contained at 0.5 to 2 percent by weight, and therefore, the conduction performance and lubrication performance of oil can be made compatible at the more desired level.

In one embodiment, an anionic, cationic, amphoteric or nonionic antistatic additive is used as the antistatic additive.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
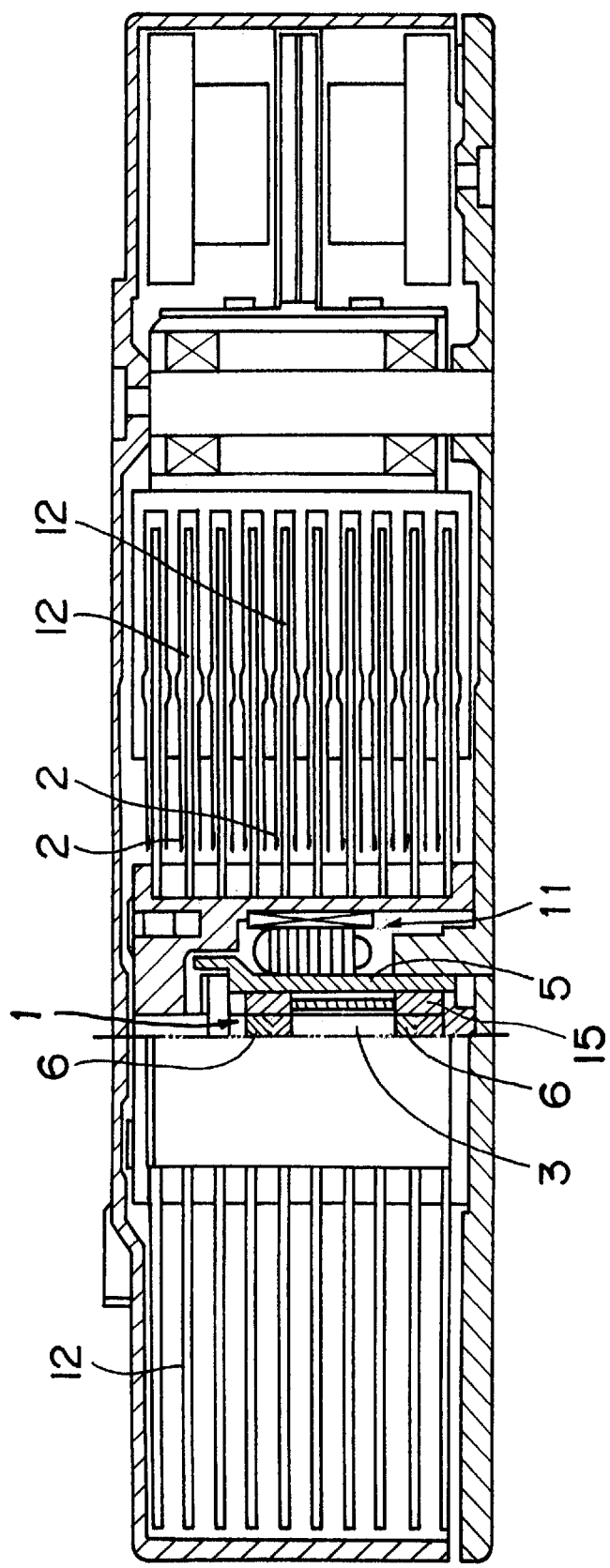
FIG. 1 is a schematic sectional view showing a fluid dynamic bearing for an HDD provided with a conductive lubricant for a fluid dynamic bearing according to an embodiment of the present invention.

The present invention will be described in detail below on the basis of the embodiment shown in the drawing.

FIG. 1 shows a fluid dynamic bearing 1 and an MR head 2 constituting an HDD. This fluid dynamic bearing 1 is provided with a shaft 3 and a housing 5 for housing this shaft 3, and fluid dynamic pressure generating grooves 6 are formed on the outer peripheral surface of the shaft 3. Then, a conductive oil (not shown) according to the embodiment of the present invention is interposed between this shaft 3 and a bearing portion 15 of the housing 5.

This conductive oil includes 97.5 percent by weight of dioctyl sebacate (DOS) that serves as an ester base oil, 1.0 percent by weight of alkyl aryl sulfonate that serves as an anionic antistatic additive and 0.5 percent by weight of amine-based antioxidant. The ester base oil is an oil that concurrently has heat resistance, a small quantity of evaporation, low cost and wettability to metal, which are necessary for a fluid dynamic bearing. Further, the dioctyl sebacate employed as the ester base oil has a kinematic viscosity of 5 to 30 cSt (centistokes) and a viscosity index of not smaller than 110 at a temperature of 40° C. At this viscosity level, dioctyl sebacate causes no increase in consumption of power of a drive motor 11 and is suitable as a lubricant for the HDD fluid dynamic bearing.

It is to be noted that alkyl aryl sulfonate that serves as the anionic antistatic additive is a salt of neutralization of alkyl benzene sulfonate and alkylamine.

If the drive motor 11 constructed of a coil and a magnet is driven concerning the fluid dynamic bearing 1 constituting the HDD shown in FIG. 1, then the shaft 3 rotates relative to the housing 5, and the fluid dynamic pressure generating grooves 6 generate a fluid dynamic pressure in the conductive oil filled between the housing 5 and the bearing portion 15 of the shaft 3, thereby supporting the shaft 3 in the radial direction relative to the housing 5. In this state, the MR head 2 located on the fixed side reads information from a magnetic disk 12 that is rotating together with the shaft 3.

According to this embodiment, the ester base oil (dioctyl sebacate) having conductivity by virtue of the anionic antistatic additive makes the shaft 3 of the fluid dynamic bearing 1 and the bearing portion 15 of the housing 5 electrically conductive, and therefore, static electricity occurring at the shaft 3 can be grounded via the housing 5.

The anionic antistatic additive (alkyl aryl sulfonate) has an affinity for the ester base oil (dioctyl sebacate) and is contained at 1.0 percent by weight in the conductive oil. Therefore, the antistatic additive can produce sufficient conductivity for discharging the static electricity without impairing the lubrication performance of the oil. It is to be noted that the conductivity of oil becomes insufficient if the antistatic additive content is smaller than 0.1 percent by weight and becomes incapable of sufficiently discharging the static electricity. If the antistatic additive content exceeds 5 percent by weight, then the lubrication performance of oil is impaired. Therefore, by virtue of the fact that the anionic antistatic additive content is 1.0 percent by weight, the oil conduction performance and oil lubrication performance can be made compatible at the desired level.

The conductive oil of this embodiment contains 0.5 percent by weight of amine-based antioxidant, and therefore, the deterioration of oil due to oxidation can be restrained, and this enables the provision of a lubricant whose performance is stabilized for a ling time. It is to be noted that a phenol-based antioxidant may be employed in place of the amine-based antioxidant. The content of this antioxidant should preferably be set within a range of 0.1 percent by weight to 5 percent by weight. An oxidation preventing ability becomes insufficient when the content is smaller than 0.1 percent by weight, and the original lubrication performance of oil is deteriorated when the content exceeds 5 percent by weight.

Although the dioctyl sebacate is employed as the ester base oil in the aforementioned embodiment, it is acceptable to employ pentaerythritol. Although the alkyl aryl sulfonate is employed as the anionic antistatic additive representative of the antistatic additive in the aforementioned embodiment, it is acceptable to employ alkyl benzene sulfonate or alkyl phosphate. It is also acceptable to employ a cationic antistatic additive of quaternary ammonium salt, amine salt or the like or an amphoteric antistatic additive of a betaine type or an alanine type. It is further acceptable to employ a nonionic antistatic additive of polyoxyethylene alkylamine or the like.

As is apparent from the above, the conductive lubricant for a fluid dynamic bearing of the present invention employs an ester base oil that concurrently has heat resistance, a small quantity of evaporation, low cost and wettability to metal, which are necessary for a fluid dynamic bearing. On this basis, an antistatic additive having an affinity for this ester base oil is contained at 0.1 to 5 percent by weight in the conductive lubricant. Therefore, according to the present invention, the conductive lubricant having conductivity by virtue of the antistatic additive contained therein makes the rotary side and the fixed side of the fluid dynamic bearing electrically conductive, thereby allowing the static electricity occurring at the fluid dynamic bearing to be grounded. The antistatic additive has an affinity for the ester base oil, and therefore, the lubrication performance is not impaired.

According to the conductive lubricant for the fluid dynamic bearing of one embodiment, the antistatic additive is contained at 0.5 to 2 percent by weight therein, and therefore, the conduction performance and lubrication performance of oil can be made compatible at the more desired level.

According to one embodiment, the antistatic additive can be provided by an anionic, cationic, amphoteric or nonionic antistatic additive.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A conductive oil for a fluid dynamic bearing, said oil comprising:
   an ester base oil,
   an antistatic additive having an affinity for the ester base oil, and
   an antioxidant, wherein the antistatic additive being contained at 0.1 to 5 percent by weight in the conductive oil, wherein a kinematic viscosity of the ester base oil is 5 to 30 cSt at a temperature of 40° C., and a viscosity index of the ester base oil is 110 or more at a temperature of 40° C.

2. A conductive oil for a fluid dynamic bearing as claimed in claim 1, wherein the antistatic additive is contained at 0.5 to 2 percent by weight in the conductive oil.

3. A conductive oil for a fluid dynamic bearing as claimed in claim 1, wherein the antistatic additive is an anionic, cationic, amphoteric or nonionic antistatic additive.

4. A conductive oil for a fluid dynamic bearing as claimed in claim 1, wherein the antioxidant is contained at 0.1 to 5 percent by weight in the conductive oil.

5. A conductive oil for a fluid dynamic bearing as claimed in claim 4, wherein the antioxidant is an amine-based antioxidant or a phenol-based antioxidant.

6. A conductive oil for a fluid dynamic bearing consisting of:
   an ester base oil,
   an antistatic additive having an affinity for the ester base oil, and
   an antioxidant, wherein the antistatic additive being contained at 0.1 to 5 percent by weight in the conductive oil.

7. A conductive oil for a fluid dynamic bearing as claimed in claim 6, wherein the antistatic additive is contained at 0.5 to 2 percent by weight in the conductive oil.

8. A conductive oil for a fluid dynamic bearing as claimed in claim 6, wherein the antistatic additive is an anionic, cationic, amphoteric or nonionic antistatic additive.

9. A conductive oil for a fluid dynamic bearing as claimed in claim 6, wherein the antioxidant is contained at 0.1 to 5 percent by weight in the conductive oil.

10. A conductive oil for a fluid dynamic bearing as claimed in claim 9, wherein the antioxidant is an amine-based antioxidant or a phenole-based antioxidant.

* * * * *